(12) United States Patent
Jesse (10) Patent No.: US 6,935,846 B2
(45) Date of Patent: Aug. 30, 2005

(54) DOSING PUMP (75) Inventor: Gerhard Jesse, Wedemark (DE)

(73) Assignee: Lutz-Pumpen GmbH & Co. KG (DE)

( * ) Notice: Subject to any disclaimer, the term of this patent is extended or adjusted under 35 U.S.C. 154(b) by 0 days.

(21) Appl. No.: 10/332,885

(22) PCT Filed: Jun. 1, 2001

(86) PCT No.: PCT/EP01/06278

§ 371 (c)(1),
(2), (4) Date: Jan. 10, 2003

(87) PCT Pub. No.: WO02/06670

PCT Pub. Date: Jan. 24, 2002

(65) Prior Publication Data

US 2003/0156959 A1 Aug. 21, 2003

(30) Foreign Application Priority Data

Jul. 13, 2000 (DE) .......................... 100 34 095

(51) Int. Cl.[7] .............................................. F04B 45/02
(52) U.S. Cl. .......................... 417/244; 92/42; 417/445; 417/473; 417/478
(58) Field of Search ................................ 417/479, 478, 417/416, 417, 412, 550, 56.6, 244, 445, 473; 222/380, 386, 259, 260, 256, 257, 321.6; 92/42

(56) References Cited

U.S. PATENT DOCUMENTS

| 293,461 | A | * | 2/1884 | Hemenway | 417/244 |
|---|---|---|---|---|---|
| 1,382,081 | A | * | 6/1921 | Heiliger | 92/42 |
| 1,580,479 | A | * | 4/1926 | Frankenfield | 417/244 |
| 3,074,351 | A | * | 1/1963 | Foster | 417/244 |
| 3,136,257 | A | * | 6/1964 | Smith et al. | 417/241 |
| 3,164,100 | A | * | 1/1965 | Hughes | 417/244 |
| 4,499,812 | A | * | 2/1985 | Pressaco et al. | 91/376 R |
| 4,781,716 | A | * | 11/1988 | Richelsoph | 623/3.18 |
| 5,088,580 | A | * | 2/1992 | Grothe et al. | 188/298 |
| 5,092,567 | A |   | 3/1992 | Wang | 267/141 |
| 5,346,187 | A | * | 9/1994 | Drescher | 267/64.11 |
| 5,557,154 | A | * | 9/1996 | Erhart | 310/80 |
| 5,567,131 | A | * | 10/1996 | McNaull | 417/417 |
| 5,601,316 | A | * | 2/1997 | Totino et al. | 285/226 |
| 6,012,910 | A |   | 1/2000 | McNaull | 417/412 |
| 6,068,448 | A |   | 5/2000 | Muratsubaki et al. | 417/44.2 |

FOREIGN PATENT DOCUMENTS

| CH | 565 947 | 7/1975 | ........... F04B/13/00 |
|---|---|---|---|
| DE | 124865 | 8/1899 | |
| DE | 3438982 | 12/1985 | ........... F04B/43/02 |
| DE | FR 2 612 995 | 9/1988 | ........... F04B/43/08 |
| DE | 4334477 | 4/1995 | ........... B23Q/5/40 |
| FR | 1 555 291 | 12/1968 | |
| FR | 1 586 672 | 1/1970 | |
| GB | 2303925 | 3/1997 | ........... G01F/15/00 |

* cited by examiner

Primary Examiner—Michael Koczo, Jr.
(74) Attorney, Agent, or Firm—Robert W Becker & Associates; Robert W Becker (57) ABSTRACT The invention relates to a dosing pump comprising a chamber, an inlet valve located in an inlet pertaining to said chamber, and an outlet valve located in an outlet pertaining to said chamber. The chamber is divided into two partial chambers (2, 18) by a separating means. Said separating means comprises a separating valve (38) which opens in the direction of conveyance and which connects the partial chambers (2, 18). The separating means can be moved back and forth in the direction of conveyance and is connected to a drive device for this purpose. When the separating means is moved in the direction of conveyance, dosing liquid is sucked in via the inlet valve (6) and is simultaneously discharged via the outlet valve (28). This process is carried out smoothly and continuously. When the separating means is moved back counter to the direction of conveyance, the dosing liquid remains virtually still in the chamber which is formed out of the two partial chambers (2, 8), in such a way that, on the whole, hardly any dosing liquid moves except for the separating means moving through the dosing liquid in the chamber.

17 Claims, 8 Drawing Sheets

DOSING PUMP

BACKGROUND OF THE INVENTION

The invention relates to a dosing pump of the type set forth in the introductory portion of claim 1.

Dosing pumps are commonly known. They serve for the dosed transport and, in particular, for the uniform dosed transport, of a dose liquid into a different medium such as, for example, water. The dosing pumps comprise a chamber with an inlet valve in an inlet into the chamber and an outlet valve in an outlet of the chamber. A portion of the wall of the chamber is formed by a membrane which is moved back and forth by a drive device. In a movement in the nature of an enlargement of the volume of the chamber, dose liquid is drawn in by suction through the inlet valve into the chamber while, in connection with a movement of the membrane in the reverse direction, the volume of the chamber reduces and, thus, dose liquid is advanced out of the chamber through the outlet valve, where it is thereafter conducted via a conduit to a desired location.

A disadvantage of a conventional dosing pump of this type is that the introduction of the dose liquid into the chamber during a suction intake process takes a comparatively long time while during that time no dose liquid passes through the outlet valve to reach the outlet and exit therethrough. On the other hand, during the switch over into the discharge process, in connection with which the dose liquid is discharged via the outlet valve as a result of a reduction in the volume of the chamber, the entirety of the dose liquid in the conduit leading to the inlet valve goes into a still condition in a spasmodic manner as a result of the closing of the inlet valve, which is disadvantageous from the standpoint of the pump process, the production of noise, and incurring wear.

SUMMARY OF THE INVENTION

The invention provides a solution to the challenge of providing a dosing pump of the relevant art which makes possible a uniform, and, in particular, a surge-free and low noise, feed of dose liquid.

The solution provided by the invention is found in the teachings set forth in the features recited in claim 1.

The core concept of these teachings is that the volume of the chamber during the pump process is allowed to basically always remain substantially unchanged and, consequently, to thereby substantially prevent surges and/or variations of the feed work—that is, both during the suction intake of dose liquid as well as during the discharge thereof out of the chamber—and this feed work is achieved by virtue of the fact that, within the chamber, a separation means is provided which partitions the chamber into two partial chambers, the separation means having a separation valve therein which closes in connection with movement of the separation means in the pump direction. The separation means is moveable back and forth in the pump direction. When the separation means is moved by a drive device in the direction of the inlet valve, the dose liquid remains in the chamber—that is, the dose liquid in both partial chambers remains in a still condition—and solely the separation means moves, the separation means moving through the substantially still dose liquid in the direction toward the inlet valve. Since, in total, there is no dose liquid movement, this movement of the separation means in the direction toward the inlet valve can be substantially surge-free and force-free and can, in particular, occur very rapidly with the result that the time required for this process can be as short as possible as can be, as well, the time during which no dose liquid is discharged through the outlet valve into the outlet.

After the separation means has approached the inlet valve in this manner, it is driven in the reverse direction—that is, in the feed direction—which then occurs in the slow and uniform manner desired in connection with a dosing pump, so that, via this slow and uniform type of pumping, the dose liquid is controllably discharged out of the outlet valve into the outlet and, at the same time, is drawn in by suction through the inlet valve into the adjacent partial chamber.

Once the separation means has reached its outermost movement point in the direction toward the outlet valve, it is again moved through the substantially still dose liquid in the chamber in the direction toward the outlet valve, whereupon the movement process is again reversed in that the separation means is moved again at the desired dosing process speed in the direction toward the outlet valve.

Since, during the return movement of the separation means against the pump direction in the direction toward the outlet valve, practically no dose liquid is moved, the return process can consequently be performed very rapidly so that, in the extreme case, the feed process is practically uninterrupted. The process is to be understood as encompassing the concept that the separation means, together with the assistance of its separation valve, "advances" the dose liquid into the chamber and, after a short return movement, again performs the "advancing process". The dosing and pump process follows, therefore, in a uniform and substantially surge-free manner. Further advantages are obtained in the form of reduced noise development and reduced wear.

The movement of the separation means can be fundamentally performed in a suitable desired manner. For example, the separation means can be configured in the form of a piston moveable in the chamber, the piston being movable in a chamber whose cylindrical inner wall is movable and thus operating to partition the chamber into the two partial chambers. In accordance with a particularly advantageous embodiment of the invention, the partial chambers comprise outer walls which are aligned with one another, substantially cylindrical and variable in the extension thereof in the axial direction, whereby the separation means is configured as a separation part sealingly connected with the outer walls and in which, preferably, the separation valve is co-axially disposed and the separation part is operatively connected with the drive device. In this embodiment, sliding parts and the wear associated therewith is avoided. The substantially cylindrical walls of the partial chambers can be configured as tube parts extendible and/or compressible in the axial direction which are, preferably, bellows-shaped.

In order to avoid a cross-sectional enlargement or a cross-sectional constriction of the tube parts during the pump process, the tube parts comprise, in furtherance of this purpose, means which is not extendible in the circumferential direction which can be configured as reinforcement, disposed in the tube parts and preferably formed of cross cord web, which is not extendible in the circumferential direction. Another embodiment of the invention is comprised of non-extendible means configured by connected rings disposed at axial spacings from the cylindrical outer walls, the rings preferably being arranged on the outer sides of the outer walls. The rings can be formed of a suitable selected material such as, for example, synthetic material or plastic. A further configuration provides, however, that the rings are formed of metal and are connected with the outer sides of the tube parts by vulcanization. This configuration is simple and, thus, can be produced in a cost-favorable manner.

In a bellows-shaped embodiment of the substantially cylindrical outer walls, the rings are disposed to best advantage on the respective narrowest and widest locations of the bellows.

The drive device can be basically configured as desired. In accordance with an advantageous embodiment of the invention, the separation part along with a drive part formed of hard material is connected with an outer threaded winding that extends co-axial to the pump direction, the outer threaded winding being in force transmission engagement with an inner threaded winding via a transmission part which is rotatably driven by the drive device. In this manner, means for cyclical reversal of the rotation direction of the transmission part is provided so that, after a rotational movement and a winding movement of the transmission part in the feed direction, there follows a return movement of the separation piece in opposition to the feed direction—that is, movement is effected via a winding movement moving the separation part in the feed direction and in opposition to the feed direction.

With respect to the above-noted drive of the separation part by means of a winding transmission, the drive device is, in furtherance of this purpose, configured as a rotation drive device, whereby the transmission part is connected with the rotor of the rotation drive device or is formed by the rotor of the rotation drive device. The rotation drive device is, consequently, in furtherance of this purpose, a rotary step motor which makes possible an exact specification of the rotation direction and the rotation speed and, therefore, an exact specification of the dose amount per unit time.

The outer threaded winding of the separation part is in force transmission engagement with the inner threaded winding via a transmission part configured as roller elements to further the goal of avoiding friction in the winding operation.

In accordance with one embodiment, the roller elements can be balls with which the outer threaded winding and the inner threaded winding are complementarily configured. In this embodiment, the separation part and the transmission part form a ball gear drive which works in a low friction and low noise manner. In correspondence with the respective requirements, the ball gear drive can comprise an external ball return path or an internal ball return path.

It is also possible, however, to configure the transmission part with an inner threaded winding and the separation part with radial grooves, whereby the inner threaded winding and the radial grooves have the profile of V-windings or threads, and with the roller elements being roller-shaped and comprising radial grooves whose profile is complementarily configured with respect to the profiles of the inner threaded winding and the radial grooves of the separation part. This embodiment comprises a roller winding drive which likewise works in a low friction and low noise manner.

An operationally fundamentally different embodiment of the drive device comprises an electro-magnetic pull magnet whose anchor is connected with the separation part or is formed by the separation part and biased via a spring against the pull direction of the pull magnet. In response to electric loading of the electric pull magnet, this pull magnet is moved rapidly with the separation means in the feed direction in the direction toward the outlet valve so that dose liquid is discharged out of the outlet and the desired feed work is achieved. Thereafter, the electric load to the electro-magnetic pull magnet is again interrupted so that the separation means is moved via the force of the spring, which is dependent upon the strength of the spring, in opposition to the feed direction.

BRIEF DESCRIPTION OF THE DRAWINGS

The invention is described in further detail hereafter in connection with the figures of the drawings.

DESCRIPTION OF PREFERRED EMBODIMENTS

Figure 1:
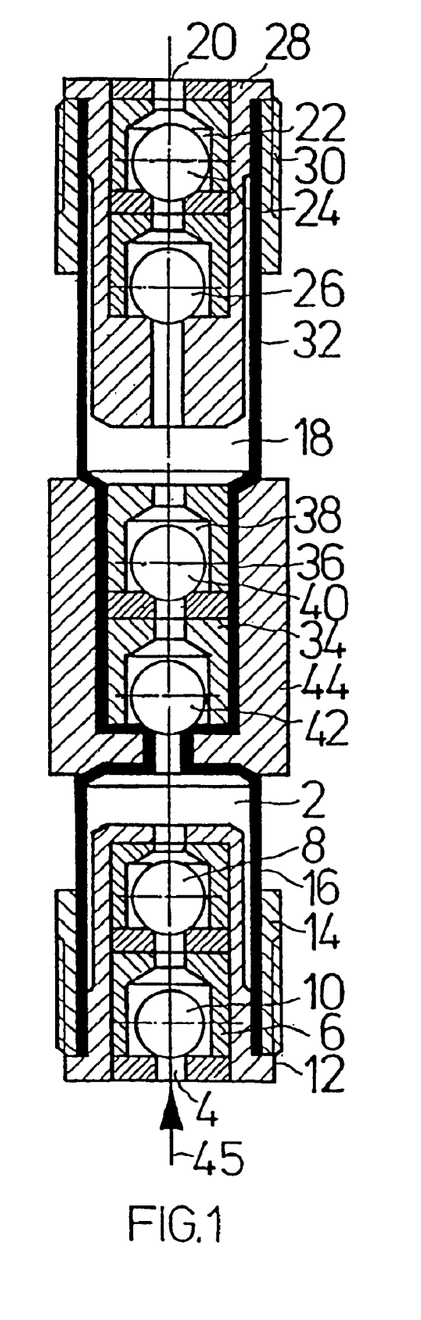
FIG. 1 shows, in sectional view, an embodiment of the dosing pump according to the invention without the drive device being shown.

FIG. 1 shows a sectional view through an inventive dosing pump in which, in the interest of a more clear illustration of the embodiment, a drive device thereof has been omitted. The dosing pump comprises a partial chamber 2 into which, via an inlet valve 6 with two valve balls 8 and 10, communicates an inlet 4. The inlet valve 6 is arranged in a cylindrical inlet component 12. The free end of a tube part 16 is clamped in a sealing manner between the inlet part 12 and a first cylindrical clamping part 14, the tube part 16 forming the outer wall of the partial chamber 2.

An outlet side of the dosing pump is configured identically to, and disposed in opposition to, this so-configured inlet side of the dosing pump, the outlet side comprising a partial chamber 18 into which is communicated, via an outlet valve 22 with valve balls 24 and 26, an outlet 20 leading to a non-illustrated outlet conduit. The outlet valve 22 is formed in an outlet part 28 and the free end of a tube part 32 is sealingly clamped between the outlet part 28 and a second cylindrical clamping part 30 enclosing the tube part. The tube part 32 forms the outer wall of the partial chamber 18.

A separation part 34 is disposed between the partial chamber 2 and the partial chamber 18, the separation part being sealingly connected with an intermediate tube part 36 which, together with the tube parts 16 and 32, is formed of a single piece. A separation valve 38 is formed in the separation piece 34 having two valve balls 40 and 42. The intermediate tube part 36 is encircled by the separation part 34 to thereby be disposed in a sealing and frictionally connected or cross fit connection with a drive part 44. In the position illustrated in FIG. 1, the drive part 44, along with the inner separation part 34, is disposed at the same spacing between the inlet part 12 and the outlet part 28.

During the operation of the illustrated dosing pump, the drive part 44 is moved in a back and forth manner between the inlet part 12 and the outlet part 28 by a drive device, which is not shown in this illustration, such that, in an alternating manner, the partial chamber 2 is enlarged and the partial chamber 18 is reduced and, during a stroke in the opposite direction, the partial chamber 2 is reduced and the partial chamber 18 is enlarged.

Figure 3:
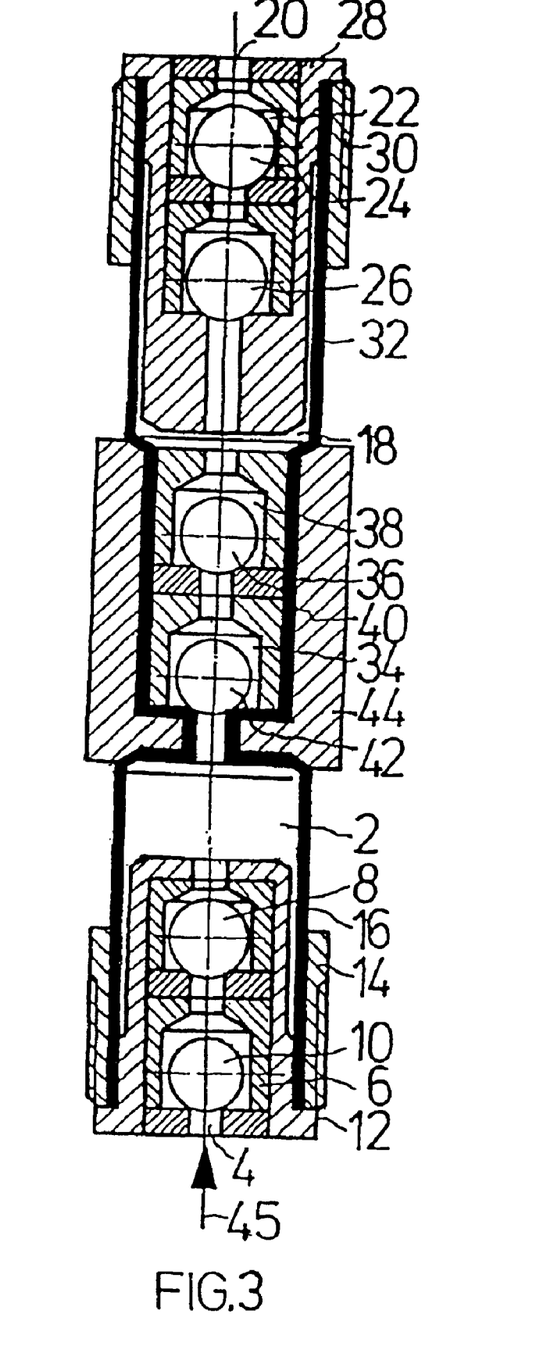
FIG. 3 shows a view of the dosing pump shown in FIG. 1 at the end of a feed stroke.

FIG. 3 shows the dosing pump shown in FIG. 1 in a position in which the partial chamber 2 is enlarged and the partial chamber 18 is reduced. To effect the discharge of the dose liquid via the outlet 20, the drive part 44, along with the separation piece 34, is moved rapidly in a pump or feed direction indicated in the drawing by an arrow 45—that is, in the direction toward the outlet part 28. In this connection, the separation valve 38 moves into a closed position so that the dose liquid is transported out of the partial chamber 18 and, thereafter, is discharged via the outlet 20 and, at the same time, dose liquid is drawn by suction into the partial chamber 2. The finish position which is thus reached is shown in FIG. 3. It can be seen that, via the constant back and forth movement of the drive part 44, dose liquid is drawn by suction into the partial chamber 2 and, consequently, dose liquid is transported out of the partial chamber 18, while, during movement in the opposite direction of the drive part 44, which follows rapidly to advance this purpose, dose liquid flows out of the partial chamber 2 into the partial chamber 18. It is significant that, in this respect, the dose liquid is neither moved through the inlet valve 6 nor through the outlet valve 22 during movement of the drive part in opposition to the feed direction 45 and, consequently, due to the rapid movement of the drive part 44, the dose liquid is only in a still condition for a short time period, leaving aside that dose liquid flows out of the dose partial chamber 2 into the partial chamber 18 through the separation valve 38 which is open at that time.

During movement in the opposite direction of the drive part 44 in the direction toward the outlet 20—that is, in the feed direction 45—an advancement of the dose liquid is effected, in that dose liquid is drawn by suction into the partial chamber 2 and is moved out of the partial chamber 18. Since, during the movement of the drive part 44 in the direction toward the inlet 4, the dose liquid in the inlet conduit and in the outlet conduit is in a still condition, no surge-type feed movement occurs that would result in a large operational still time. Since no feed movement occurs during the movement of the drive part 44 in the direction toward the inlet 4, leaving aside the overflow of the dose liquid out of the partial chamber 2 into the partial chamber 18, a corresponding movement of the drive part 44 can occur very rapidly in the desired manner so that the entire feed process is only interrupted for a short time. As a consequence thereof, there occurs a substantially uninterrupted uniform feed movement as is desired in connection with dosing pumps.

Figure 4:
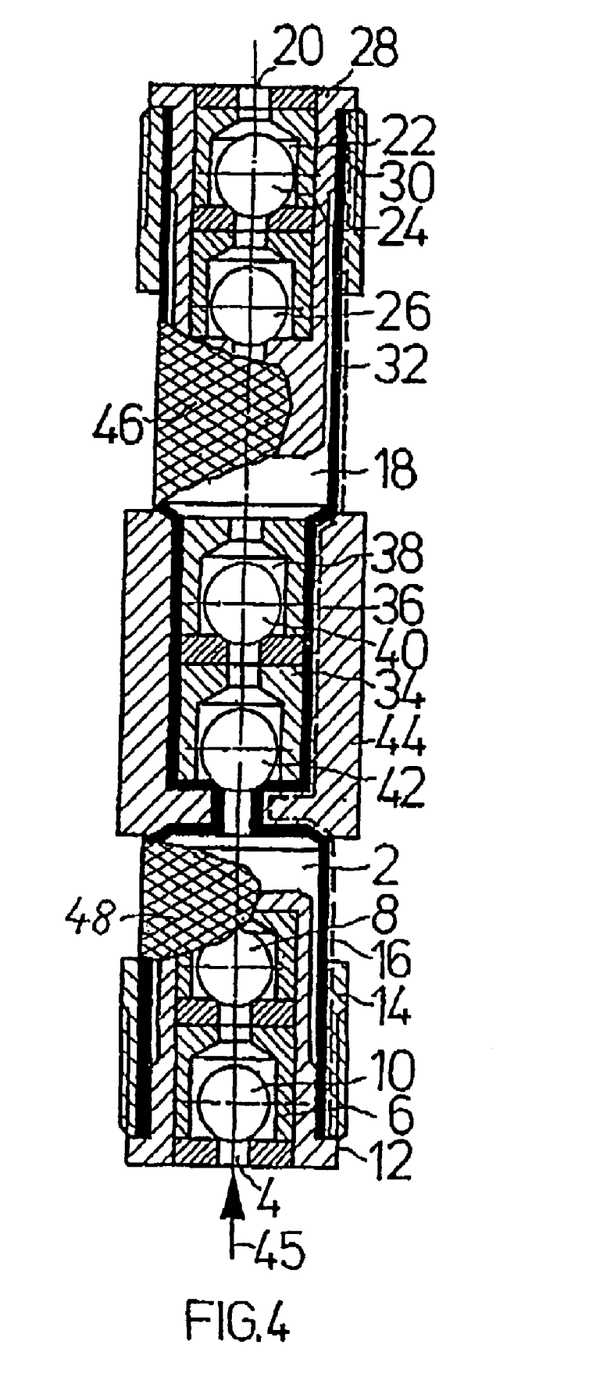
FIG. 4 shows a view of a first modification of the embodiment shown in FIG. 1.

FIG. 4 shows an embodiment identical to that shown in FIG. 1 with the difference that the tube part 16 and the tube part 32 are, in part, not shown in cut-away view and, therefore, cross cord webs 46 and 48 can be seen which prevent a ballooning out or inflation of the tube parts 16 and 32 under pressure and, consequently, in connection with movement of the drive part 44, there only occurs a compressive or extension movement of the tube parts 16 and 32 with the result that the variation of the volumes of the partial chambers 2 and 8 and, correspondingly, the required amount of dose liquid as well, is substantially proportional to the movement of the drive part 44.

Figure 5:
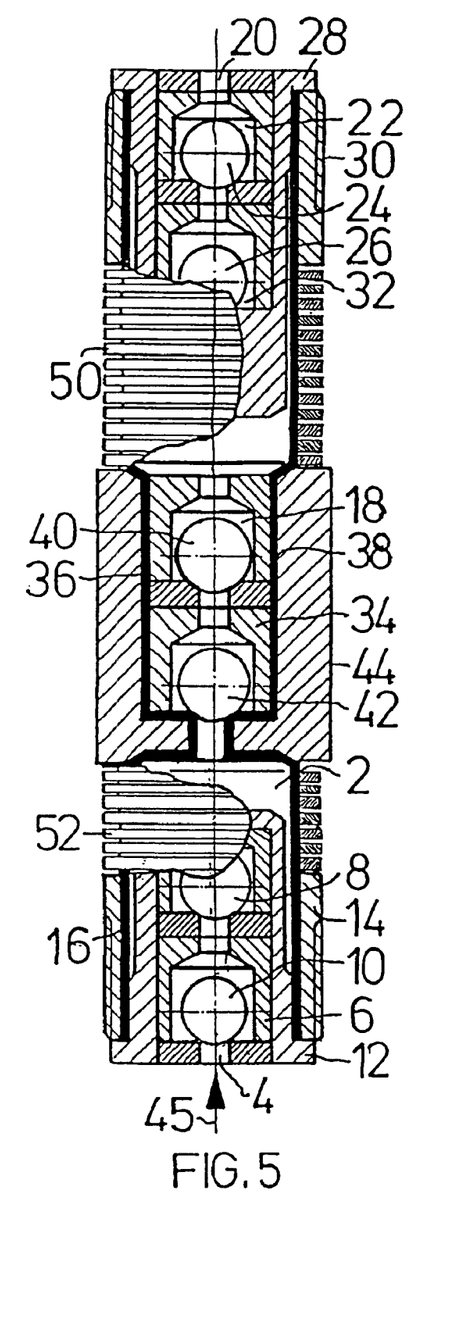
FIG. 5 shows a view of a second modification of the embodiment shown in FIG. 1.

FIG. 5 shows an embodiment identical to that of the dosing pump shown in FIG. 1 in which identical parts are indicated with the same reference numerals. A difference exists between the embodiments in that the tube parts 16 and 32 are, in part, not shown in cut-away view so as to thereby permit a better view of the rings 50 and 52 which encircle the tube parts 16 and 32 and are connected therewith via vulcanization. These rings 50 and 52 prevent, in the same manner as the cross cord web 46 shown in FIG. 4, a ballooning out or inflation of the tube parts 16 and 32 but also, at the same time, prevent a pulling together or contraction of these tube parts 16 and 32, so that, during each movement of the drive part 44, the variation of the volumes of the partial chambers 2 and 18 is exactly proportional to the movement of the drive part 44.

Figure 6:
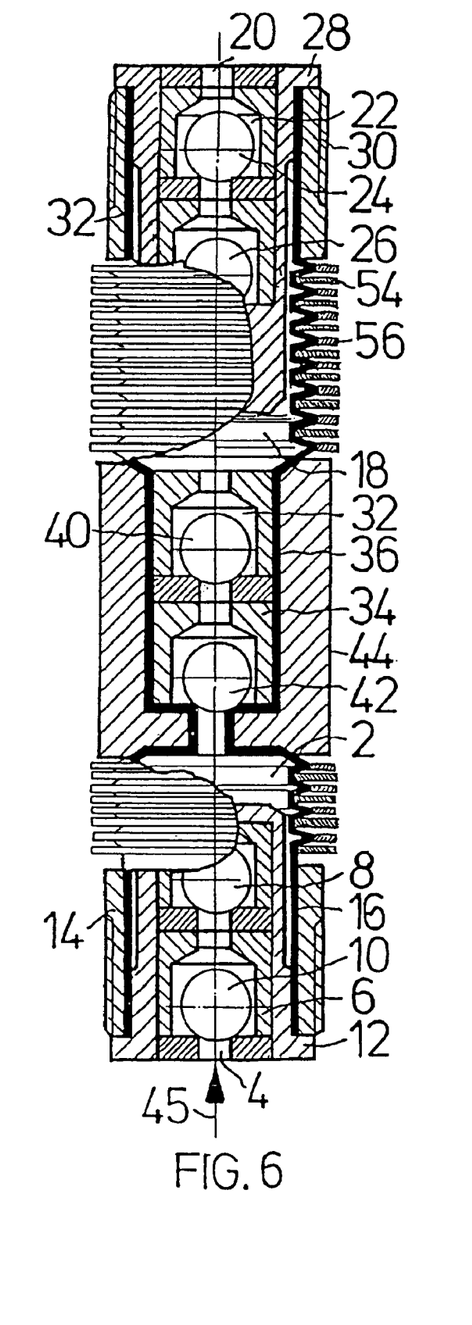
FIG. 6 shows a view of a third modification of the embodiment shown in FIG. 1.

FIG. 6 shows a modification of the embodiment shown in FIG. 5. Identical parts or corresponding parts are again indicated with the same reference numerals. The difference between the illustrated embodiments is that the tube parts 16, 32 shown in FIG. 6 are configured in bellows-like configurations, whereby rings 54 are disposed on the narrowest locations and rings 56 are disposed on the widest locations of the bellows. In this embodiment, due to the bellows-like configuration of the tube parts 16, 32, a particularly easy moveability of the drive part 44 in the movement direction is provided.

Figure 7:
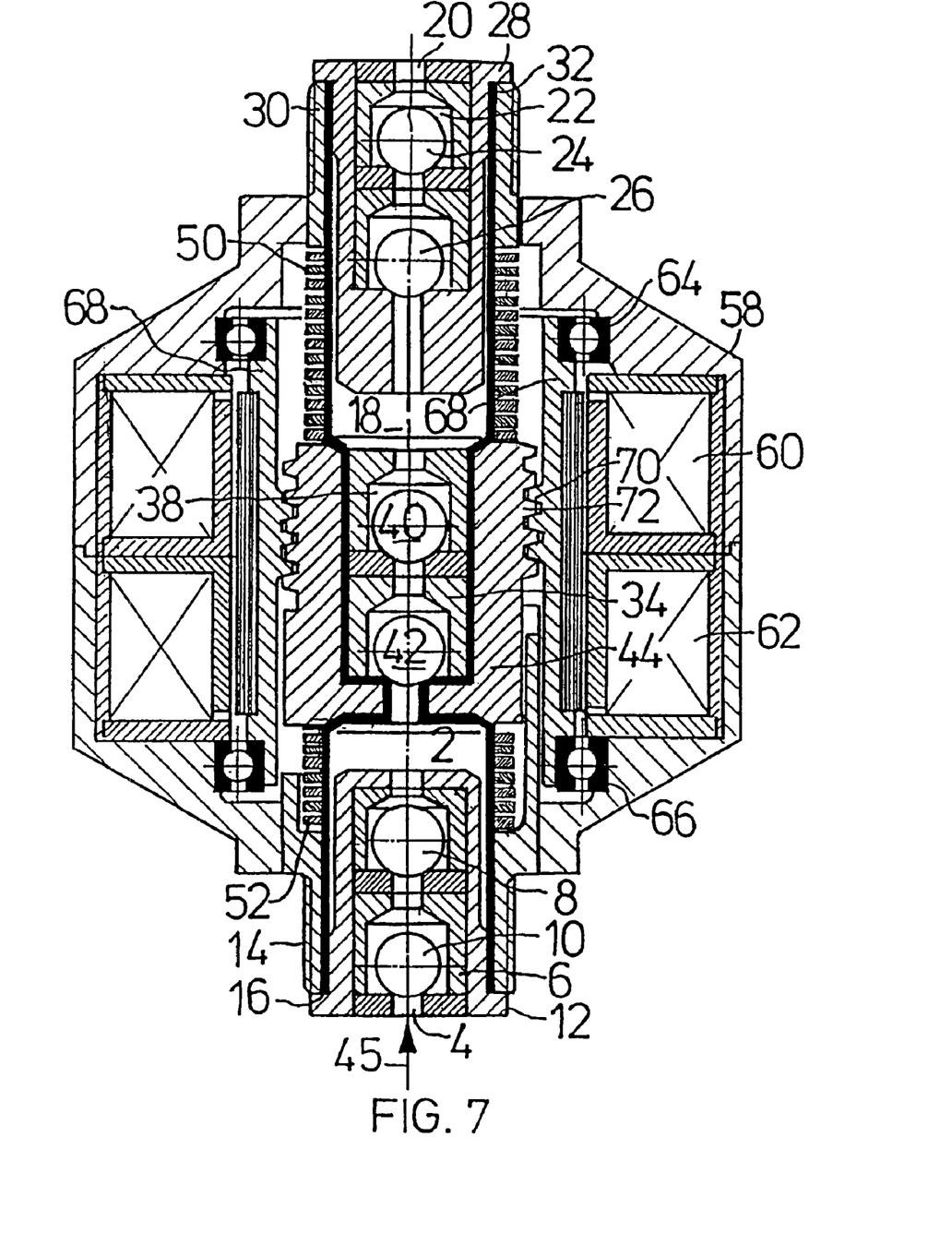
FIG. 7 shows a view of the embodiment shown in FIG. 5 together with a first embodiment of a drive device.

FIG. 7 shows a dosing pump of the embodiment shown in FIG. 5 together with a drive device which compromises a rotary step motor 58, also designated as a dose motor, having excitation windings 60, 62 and a rotor 68 supported on ball bearings 64, 66, the cylindrical inner surface of the rotor having an inner threaded winding 70 that, together with an outer threaded winding 72, operationally engages the correspondingly configured outer surface of the drive part 44. In connection with corresponding excitation of the rotary step motor 58, the inner threaded winding 70 effects movement of the outer threaded winding 72 and, consequently, movement as well of the drive part 44 in a direction which is dependent upon the direction of the electrical load, while, during corresponding different electric loading, a movement of the drive part 44 in the opposite direction is effected. Via constant change of the electric load and, therefore, of the rotation direction of the rotary step motor, the drive part 44 is correspondingly moved back and forth and the feed work is accomplished in the basic manner described with respect to FIGS. 1–3. The rotational speed of the rotary step motor and, consequently, the speed of movement of the drive part 44 in both directions, can be chosen in consideration of the feed operation described with respect to FIGS. 1–3 and accommodated thereto.

Figure 8:
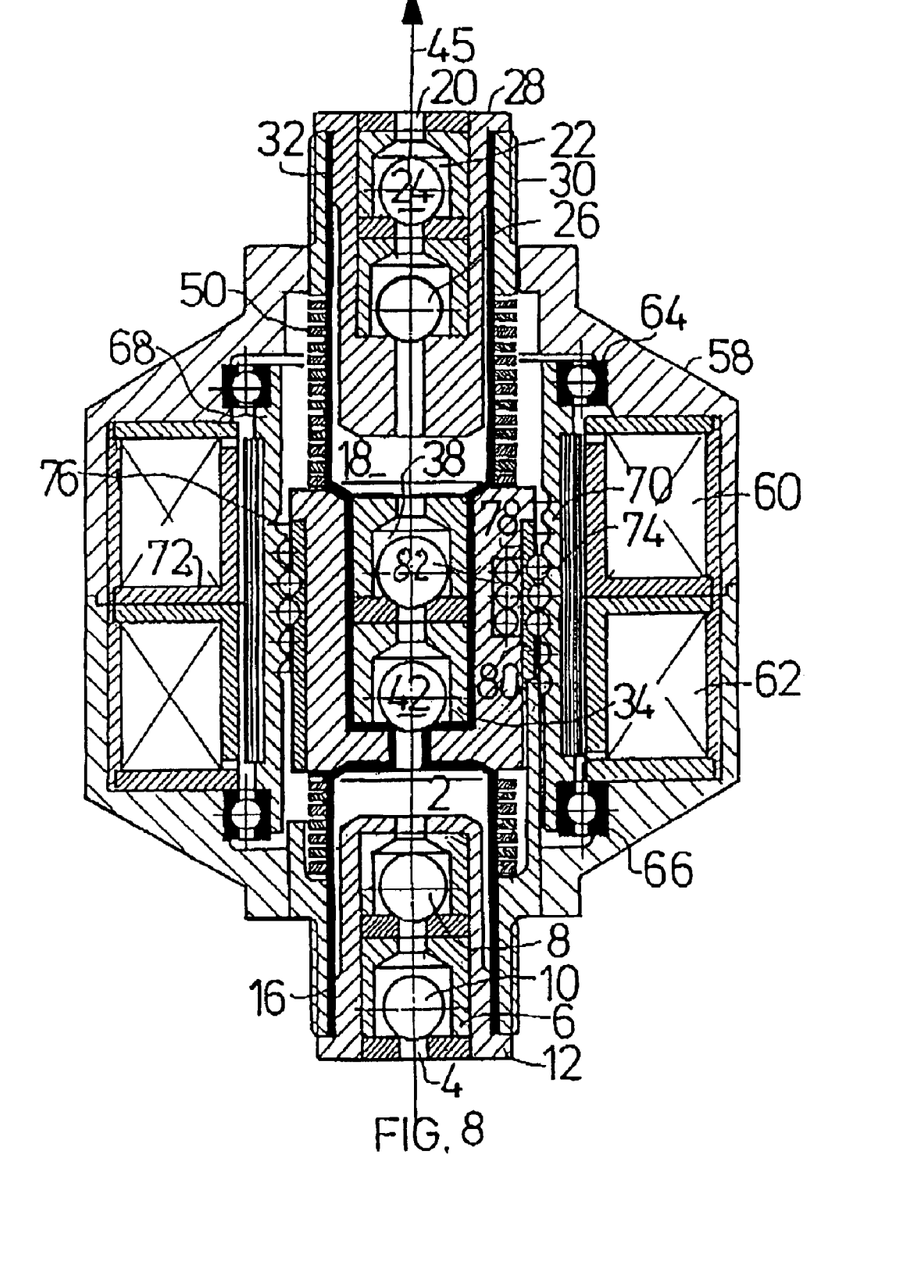
FIG. 8 shows a view of the embodiment shown in FIG. 5 together with a second embodiment of a drive device.

FIG. 8 shows the embodiment illustrated in FIG. 5 in the same manner as the embodiment is shown in FIG. 7 with, however, a second embodiment of a drive device. In this connection, to the extent there are components identical to those shown in FIG. 7 by virtue of the use of the rotary step motor 58, the same reference numerals are used. The difference between the embodiment shown in FIG. 8 relative to that shown in FIG. 7 is that the transmission of the winding movement is effected via rolling elements configured as balls 74 which move in a guided manner in correspondingly complementary formed grooves 76 in the rotor 68 and 78 so as to engage a transmission part 80, whereby, in the transmission part 80, passages are provided in a conventional manner through which the balls enter into a space 82 formed behind the transmission part 80 and can alternatingly travel in opposite directions such that there occurs a continuous circulation of the balls 74.

Figure 9:
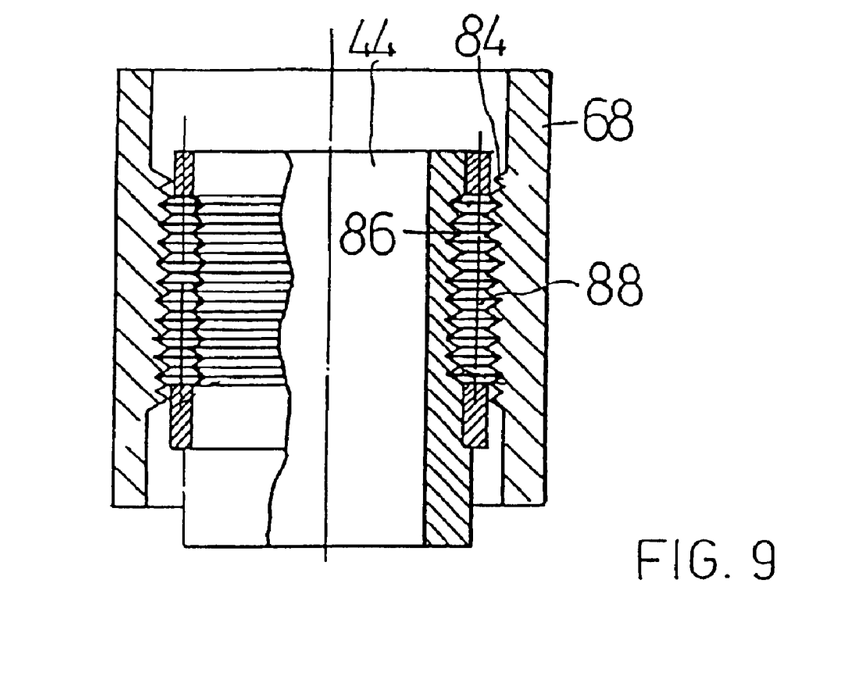
FIG. 9 shows a view in individual details of a modification of the drive device shown in FIG. 8 in an axial sectional view thereof.

FIG. 9 shows in individual detail, in a cross-sectional view thereof, a modification of the roller element transmission shown in FIG. 8. The same or corresponding parts are indicated with the same reference numerals. An inner-threaded winding 84 is formed in the cylindrical inner surface of the rotor 68 while radial grooves 86 are formed in the outer surface of the drive part 44. The inner-threaded winding 84 and grooves 86 have the profile of V-windings. Substantially cylindrical, roller-shaped roller elements 88 are disposed between the windings 84 and the grooves 86, the circumferential surface of the roller elements being provided with radial grooves and peaks complimentarily configured with respect to the profiles of the windings 84 and the grooves 86 such that, during rotation of the rotor 68, the roller elements 88 travel in a rolling manner along the winding path and, consequently, an axial movement of the drive part 44 is effected.

Figure 10:
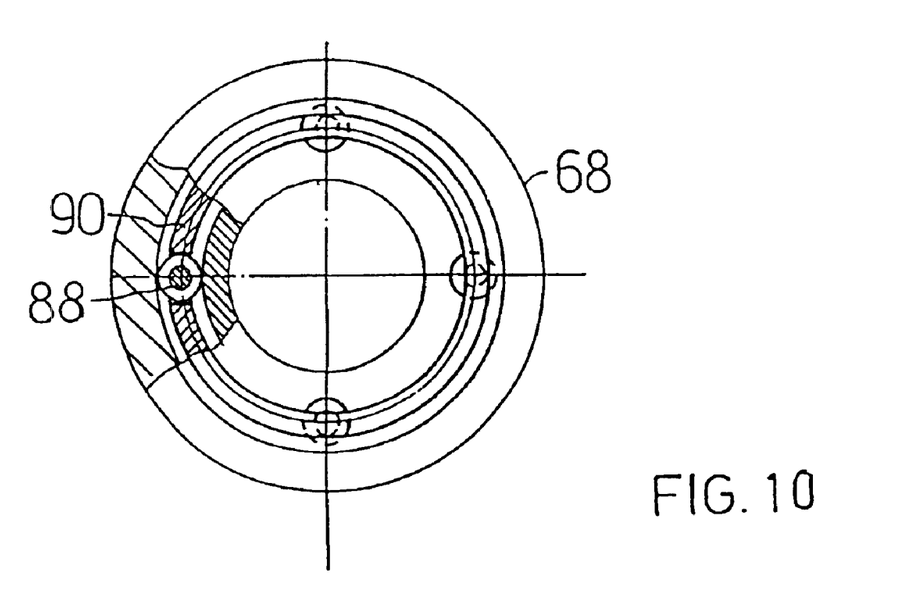
FIG. 10 shows a view of the drive device shown in FIG. 9 in a radial sectional view thereof.

FIG. 10 is a transverse sectional view of the embodiment shown in FIG. 9. It can be seen that the roller-shaped roller elements 88 are maintained at a spacing to one another in the circumferential direction by a cage 90.

Figure 11:
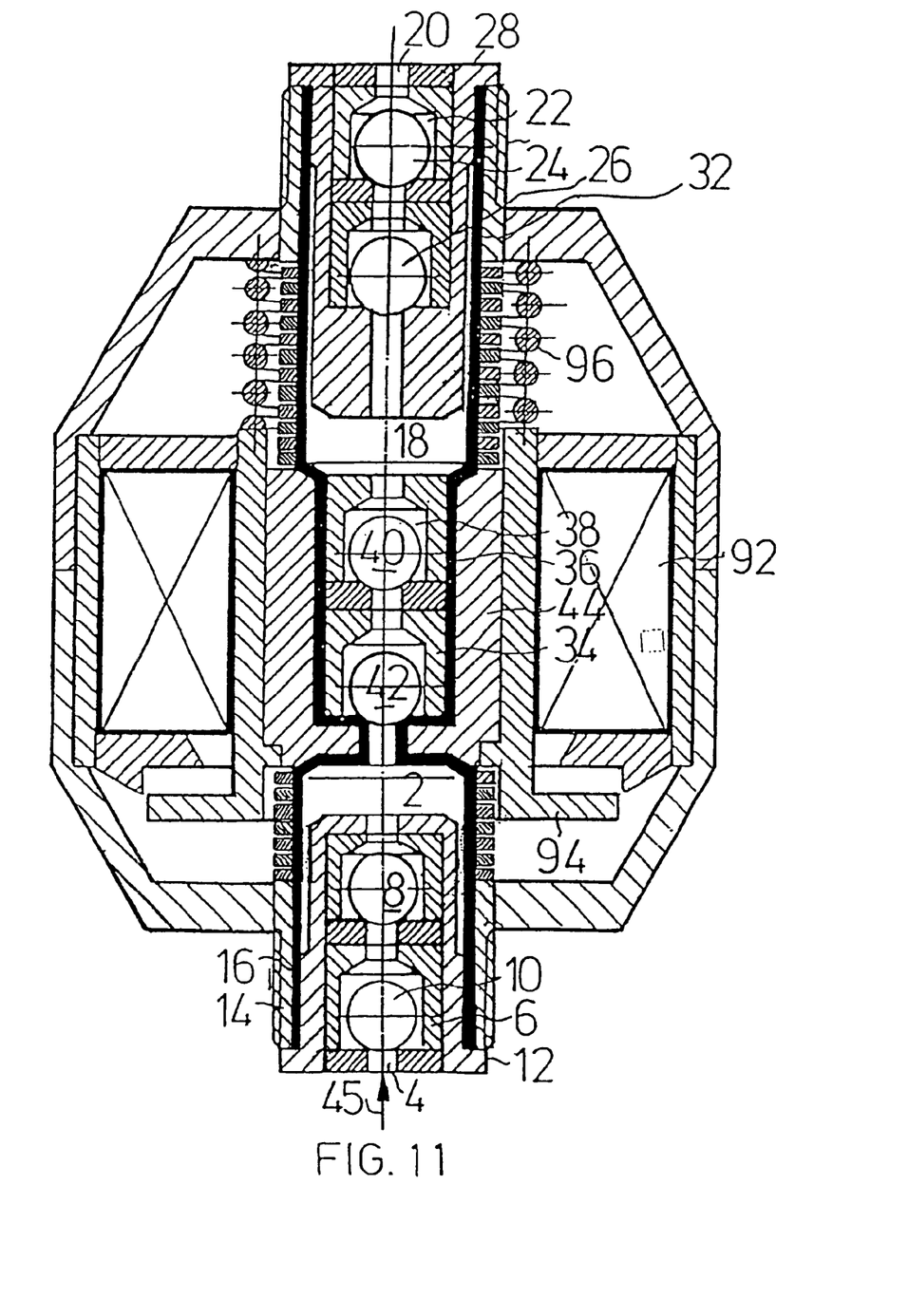
FIG. 11 shows a view of the embodiment shown in FIG. 5 together with a third embodiment of a drive device.

FIG. 11 shows the embodiment shown in FIG. 5 of the pump together with a third embodiment of a drive device. This drive device comprises, in this configuration, an electromagnetic pull magnet with an excitation winding 92 and a pull anchor 94 which is connected with the drive part 44 and biased via a spring 96 in a direction in opposition to the pull direction of the pull anchor 94, the pull direction being toward the top as shown in the drawing.

Figure 2:
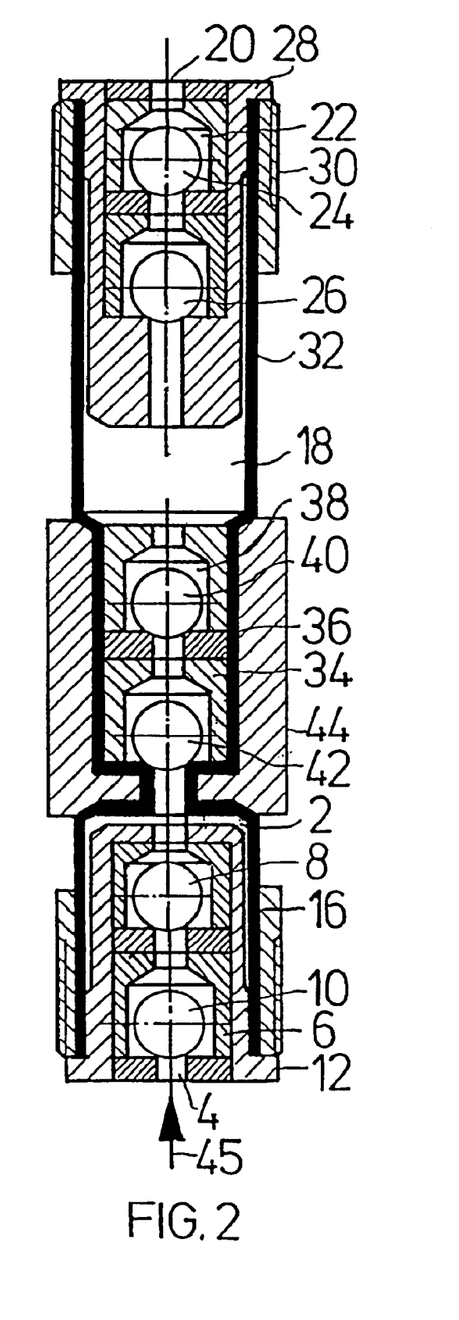
FIG. 2 shows a view of the dosing pump as shown in FIG. 1 in the suction intake position.

Upon excitation of the excitation winding 92, the pull anchor 94 is pulled upwardly against the force of the spring 96—that is, in the feed direction 45—and, as well, the drive part 44 together with the separation part 34 are pulled upwardly such that the dose liquid is discharged out of the outlet 20 out of the partial chamber 18 and, at the same time, dose liquid is drawn in by suction through the inlet 4 into the partial chamber 2 and, thus, the feed of the dose liquid is effected as has been described in connection with FIGS. 1–3. After the de-excitation of the excitation winding 92, the spring 96 presses the drive part 44 with the separation part 34 in the downward direction as shown in the drawing in the direction toward the inlet 4.

The specification incorporates by reference the disclosure of German priority document on DE 100 34 095.4 filed 13 Jul. 2000 and PCT/EP01/06278 filed 1 Jun. 2001).

The present invention is, of course, in no way restricted to the specific disclosure of the specification and drawings, but also encompasses any modifications within the scope of the appended claims.

What is claimed is:

1. A dosing pump, comprising:
   a separation means;
   a chamber having an axis, the chamber being partitioned by the separation means into two partial chambers;
   an inlet communicated via an inlet valve with one of the partial chambers for the flow of dose liquid into the chamber; and
   an outlet communicated via an outlet valve for flow of dose liquid out of the chamber, the dose liquid overall path of the separation means being alternatingly movable in a feed direction along an axis in a manner which effects the discharge of dose liquid from the chamber outwardly through the outlet valve and in a reverse direction axially opposite to that of the feed direction in a manner which effects re-positioning of the separation means for the subsequent movement of the separation means in the feed direction, the separation means having a one-way separation valve permitting flow of dose liquid therethrough during movement of the separation means in the reverse direction and not permitting flow therethrough during movement of the separation means in the feed direction, each of the partial chamber having outer walls with the outer wall of each partial chamber being generally co-axially aligned with the outer wall of the other partial chamber and the length of each outer wall being variable in the axial direction to at least one of an axially compressed length and an axially extended length, and the separation means being sealingly connected with the outer walls of the partial chambers and being operatively connected with a drive device for driving movement of the separation means, wherein the outer walls of the partical chambers are comprised of substantially cylindrical tube parts, wherein the separation means is formed of hard material and comprises an outer threaded winding, an inner threaded winding, a transmission part, and means for cyclic reversal of the rotation direction of the transmission part, the outer threaded winding being co-axial to the feed direction and in force transmission engagement with the inner threaded winding via the transmission part which is rotatably driven by the drive device, and the means for cyclic reversal of the rotation direction of the transmission part cyclically reversing the rotation direction of the transmission part to effect alternating movement of the separation means.

2. A dosing pump according to claim 1, wherein the tube parts are bellows-shaped.

3. A dosing pump according to claim 1, wherein the tube parts comprise means which are not extendible in the circumferential direction.

4. A dosing pump according to claim 3, wherein the means which are not extendible in the circumferential direction is formed by non-extendible reinforcement arranged in the tube parts.

5. A dosing pump according to claim 4, wherein is configured as a cross cord web.

6. A dosing pump according to claim 3, wherein the non-extendible means is configured at an axial spacing from the cylindrical tube parts and further comprising rings which encircle the tube parts.

7. A dosing pump according to claim 6, wherein the rings are arranged on the outer sides of the tube parts.

8. A dosing pump according to claim 7, wherein the tube parts are bellows-shaped and the rings are arranged on the respective narrowest and widest locations of the bellows-shaped tube parts.

9. A dosing pump according to claim 6, wherein the rings are formed of metal and are connected with the outer side of the tube part.

10. A dosing pump according to claim 9, wherein the rings are connected with the outer side of the two parts via vulcanization.

11. A dosing pump according to claim 1, wherein the drive device is a rotation drive device end is configured such that the transmission part is a selected one of a transmission part connected with the rotor of the rotation drive device and a transmission part formed by the rotor of the rotation drive device.

12. A dosing pump according to claim 1, wherein the rotation drive device is configured as a rotary step motor.

13. A dosing pump according to claim 1, wherein the outer threaded winding of the separation part is, via roller elements, in force transmission engagement with the inner threaded winding of the transmission part.

14. A dosing pump according to claim 13, wherein the roller elements are balls and the outer threaded winding and the inner threaded winding are complementarily configured with respect thereto.

15. A dosing pump according to claim 13, wherein the transmission part comprises an inner threaded winding and the separation part comprises radial grooves, whereby the inner threaded winding and the radial grooves have the profile of V-windings and the roller elements are roller-shaped and comprise radial grooves whose profile is complementarily configured with respect to the profiles of the inner threaded winding and the radial grooves of the separation part.

16. A dosing pump according to claim 1, wherein the drive device comprises en electro-magnetic pull magnet having an anchor associated with the separation means and biased via a spring against the pull direction of the pull magnet.

17. A dosing pump according to claim 1, wherein the separation valve is co-axial with the separation means.

* * * * *